United States Patent
Smedley et al.

(10) Patent No.: US 7,236,146 B2
(45) Date of Patent: Jun. 26, 2007

(54) HAND-HELD DISPLAY DEVICE

(75) Inventors: Jonathan W. Smedley, El Paso, TX (US); Po W. Hu, El Paso, TX (US); Leon W. Schmidt, Spokane, WA (US)

(73) Assignee: Axxion Group Corporation, El Paso, TX (US)

( * ) Notice: Subject to any disclaimer, the term of this patent is extended or adjusted under 35 U.S.C. 154(b) by 479 days.

(21) Appl. No.: 10/717,180

(22) Filed: Nov. 19, 2003

(65) Prior Publication Data

US 2004/0155845 A1 Aug. 12, 2004

Related U.S. Application Data

(63) Continuation-in-part of application No. 29/175,876, filed on Feb. 12, 2003, now Pat. No. Des. 493,491.

(51) Int. Cl.
*G09G 3/00* (2006.01)
*G09G 3/14* (2006.01)

(52) U.S. Cl. .............. 345/31; 345/39; 345/84; 40/410; 340/815.4

(58) Field of Classification Search .......... 345/6, 345/31, 46, 82, 84
See application file for complete search history.

(56) References Cited

U.S. PATENT DOCUMENTS

| | | | |
|---|---|---|---|
| 4,601,255 A | 7/1986 | Marcotti | |
| 4,807,557 A | 2/1989 | Lodisio | |
| 5,302,965 A | 4/1994 | Belcher et al. | |
| 5,406,300 A | 4/1995 | Tokimoto et al. | |
| 5,548,300 A * | 8/1996 | Tokimoto | 345/39 |
| 5,670,971 A | 9/1997 | Tokimoto et al. | |
| 5,748,157 A | 5/1998 | Eason | |
| 6,037,876 A | 3/2000 | Crouch | |
| D433,022 S | 10/2000 | Lucas | |
| 6,193,384 B1 | 2/2001 | Stein | |
| 6,222,459 B1 | 4/2001 | Ting | |
| D442,597 S | 5/2001 | Meyers et al. | |
| 6,265,984 B1 * | 7/2001 | Molinaroli | 340/815.4 |
| 6,278,419 B1 | 8/2001 | Malkin | |
| 6,486,858 B1 | 11/2002 | Altman | |
| 6,626,293 B2 | 9/2003 | St. Jeor | |

* cited by examiner

*Primary Examiner*—Richard Hjerpe
*Assistant Examiner*—Duc Dinh
(74) *Attorney, Agent, or Firm*—Karl L. Larson; Gardere Wynne Sewell LLP (57) ABSTRACT

A display device comprising a first body and a second body, the second body connected to the first body at a rotary connection. A display element, which may include one or more light-emitting diodes, is disposed on the second body. A controller is electrically connected to the first display element so as to vary the state of the display element in response to relative movement between the first body and second body.

23 Claims, 11 Drawing Sheets

HAND-HELD DISPLAY DEVICE

CROSS-REFERENCE TO RELATED APPLICATIONS

This application claims priority to U.S. Design patent application Ser. No. 29/175,876 filed Feb. 12, 2003 now U.S. Pat. No. D. 493,491 and titled "HAND-HELD DISPLAY DEVICE".

TECHNICAL FIELD OF THE INVENTION

The present invention relates in general to display devices, and in particular to a display device having one or more display elements disposed on one or more surfaces thereof, which display elements change their states in response to movement of the display elements to form patterns.

BACKGROUND OF THE INVENTION

Although incandescent lamps have traditionally been used for larger-scale lighting, signaling and imaging functions, such applications are increasingly making use of light-emitting diodes owing to their long-life, high brightness and relatively low power consumption. Their response time from off to on and back is also improved over incandescent lamps, providing additional functionality.

A light-emitting diode (LED) emits a light when electrons from an N-region and holes from a P-region are moved to a PN junction section and are recoupled in a PN junction semiconductor when a forward voltage is applied. Since the energy released when the free electrons are coupled is radiated as light, the light emitted from the LED is light in a narrow wavelength range, i.e. light of a single color such as red or blue.

A so-called "full-color" LED device can generate white light by using a combination of a red light-emitting element for emitting red light, a blue light-emitting element for emitting blue light and a green light-emitting element for emitting green light. Research has been undertaken to develop an LED device capable of emitting white color using one kind of light-emitting element. Such an LED device is called a white LED device and is distinguishable from the full-color LED device. Using a white LED device enables a back light or the like to be driven by a simple electric circuit without requiring an inverter circuit and the like, and reduces power consumption. This presents advantages such as reducing the outer configuration of the driving circuit and eliminating electromagnetic noise.

Since a white LED device must generate white light by using only one kind of light-emitting element (single-color), it has been the general practice to use a single-color light-emitting element in combination with a phosphor that can convert the wavelength of light emitted from the light-emitting element to emit light of another color. For example, white LED devices which have a layer containing YAG (yttrium aluminate) phosphor provided on a blue light-emitting element are commercially available. The YAG phosphor generally emits light in the green to yellow region, depending on the kind of activating element in the YAG.

Owing to the increased flexibility and affordability of LEDs able to emit light across various frequencies, thereby enabling full-color display, modem electronic displays increasingly employ LEDs for larger-scale imaging and display applications.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

According to a first embodiment, the present invention is a display device comprising a first body and a second body, the second body connected to the first body at a rotary connection. A first display element is disposed on the second body. A controller is electrically connected to the first display element so as to vary the state of the first display element in response to relative movement between the first body and second body. The first body may be, for example, a handle. The second body may have a generally-rectangular shape and be connected to the first body adjacent to an edge of the rectangular shape. The second body may have a proximate end adjacent the first body and a distal end upon which the first display element is disposed.

In a second embodiment, the present invention is a method of displaying a pattern. The method may include the steps of: providing a first body; connecting a second body to the first body at a rotary connection; disposing a first display element on the second body; applying an angular velocity to the second body relative to the first body; and varying the state of the first display element in a predetermined pattern. As with the first embodiment, the first body may be a handle. The second body may have a generally-rectangular shape and be connected to the first body adjacent to an edge of the rectangular shape. The display element may include one or more light-emitting diodes.

In a third embodiment, the present invention is a device for displaying a pattern. The device includes a first body and a second body, with the second body attached to the first body at a rotary connection. A first display element is disposed on the second body emitting a first wavelength. A second display element is disposed on the second body adjacent the first display element. The device further includes a means for varying the state of the first display element and second display element in a predetermined pattern in response to an angular velocity applied to the second body relative to the first body. The first display element and second display element may be, as examples, light-emitting diodes. The device may include three or more display elements.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE DRAWINGS

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

The display device of the present invention relies on the persistence mechanism of human vision to create the illusion of images floating in space. As a column of lights is flashed in a particular pattern as it is moved in space, the persistence mechanism of human vision will remember the positions of the lights for a brief period of time. If the pattern of light is changed from one moment to the next, the observer's eye-brain will store this flashed pattern long enough to perceive a complete image.

Figure 1:
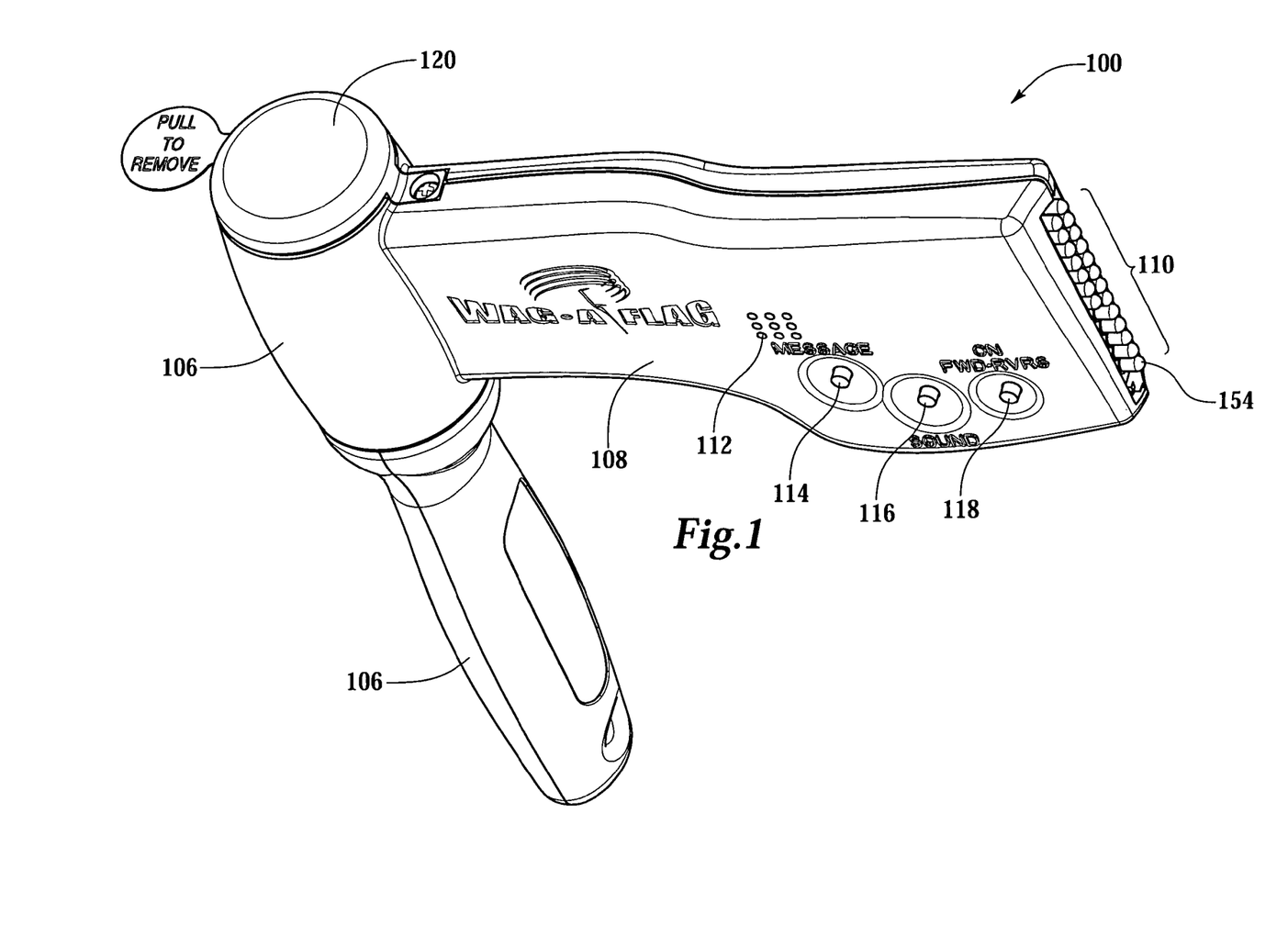
FIG. 1 is an isometric view of a display device according to one embodiment of the present invention.
Figure 2:
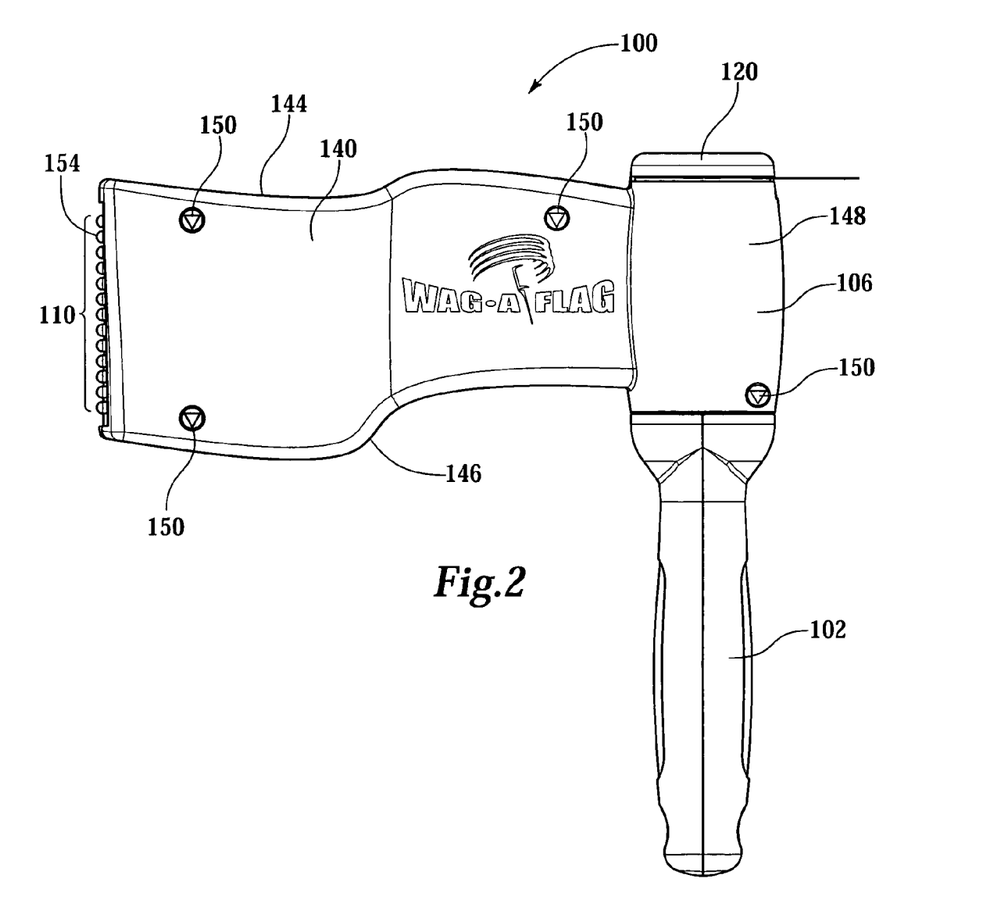
FIG. 2 is a back view of the display device.
Figure 3:
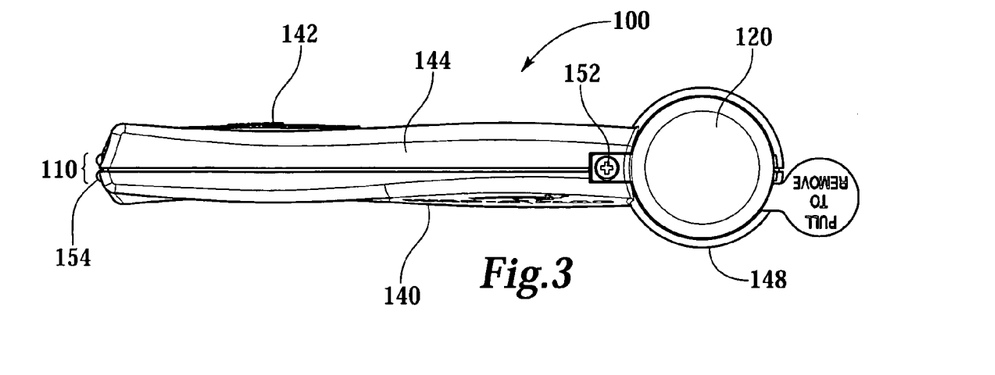
FIG. 3 is a top view of the display device.
Figure 4:
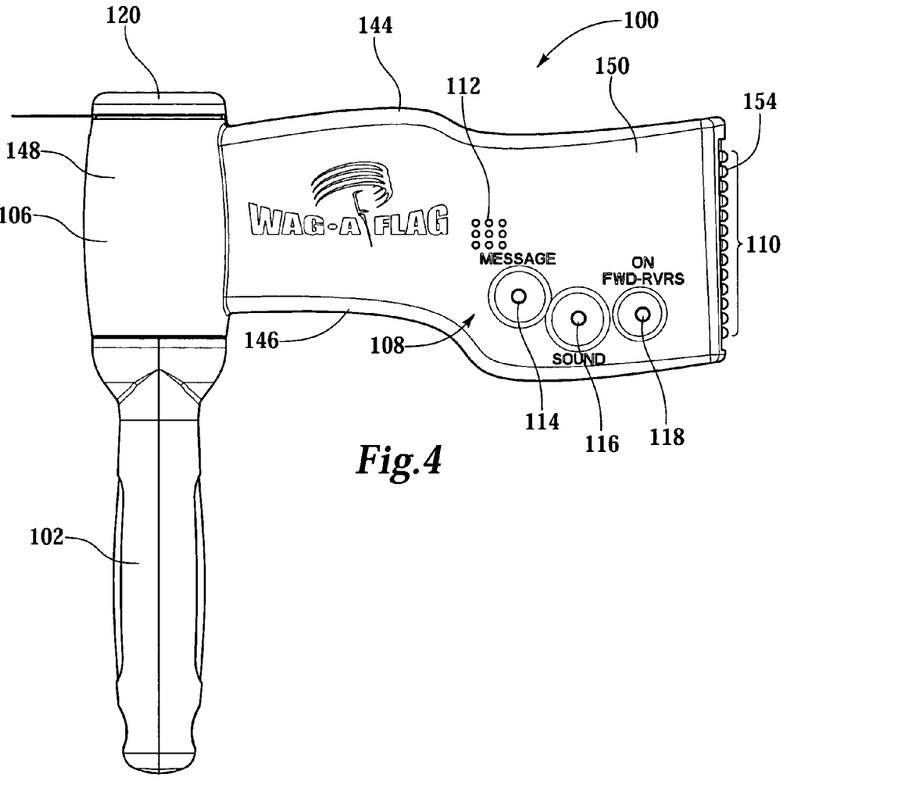
FIG. 4 is a front view of the display device.
Figure 5:
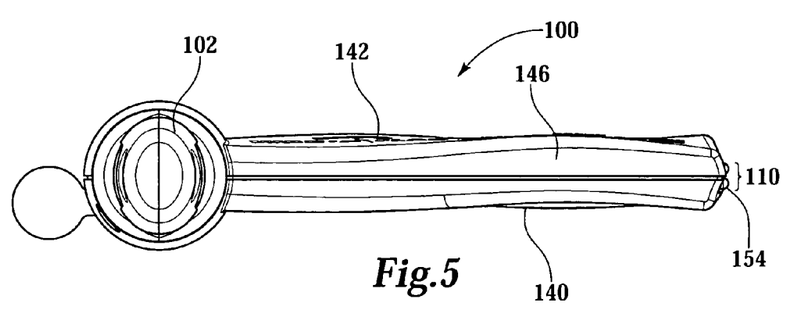
FIG. 5 is a bottom view of the display device.
Figure 6:
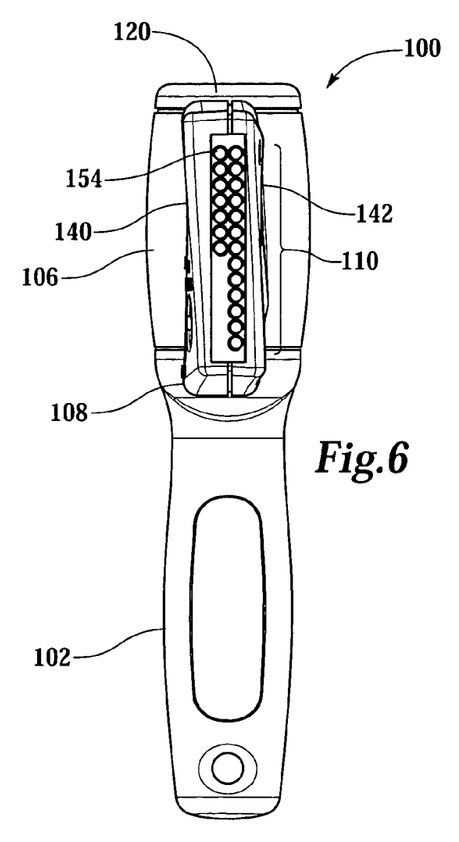
FIG. 6 is a right end view of the display device.
Figure 7:
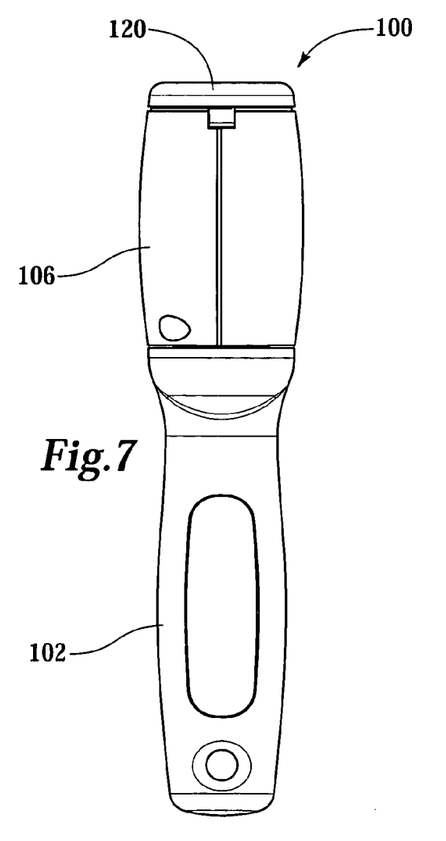
FIG. 7 is a left end view of the display device.

Display device 100, shown in FIGS. 1–7, includes a handle 102 having a rotary body 104 disposed on the upper portion thereof. Rotary body 104 includes a barrel 106 disposed about a portion of the handle 102, and an extension 108 extending radially from the barrel 106. An LED array 110 is disposed on the distal end of the extension 108, opposite the barrel 106. A speaker grille 112 is disposed in the extension 108, along with user controls, which may include a message button 114, a sound button 116 and a power button 118. Message button 114 may be used to select a message or image for display on the LED array 110 of one or more LEDs 154. Sound button 116 may be used to select a sound effect or song to be played by a speaker within the display device 100. Power button 118 may be used to turn the display device 100 on or off, and may also be used to select the direction of rotation of the display device 100. The upper end of barrel 106 is covered by a cap 120. Although a particular shape is shown in FIG. 1, those of skill in the art will appreciate that the teachings of the present disclosure may be employed in connection with a wide variety of shapes and geometrical configurations.

Extension 108 has a back surface 140, a front surface 142, a top surface 144 and a bottom surface 146. Barrel 16 has an outer surface 106. Surfaces 140–146 are shown as having a warped, non-planar shape in order to evoke the idea of a flag in the wind, but nothing within the present invention is limited to surfaces of this shape. For example, surfaces 140–146 could be substantially planar without departing from the spirit and scope of the present invention. Similarly, the outer surface 108 of barrel 106 has a bulging cylindrical shape, but this is not essential to the invention.

Extension 108 is held together with one or more fasteners 150. Four fasteners 150 are depicted in display device 100, but nothing in the present invention is limited to this number. Cap 120 is retained by one or more upper fasteners 152. A single fastener 152 is shown in connection with display device 100, but more fasteners 152 may be employed. Alternately, securement devices other than fasteners 150 and 152 may be employed without departing from the spirit and scope of the present invention. These might include, for example, snaps, clips or adhesives.

Figure 8:
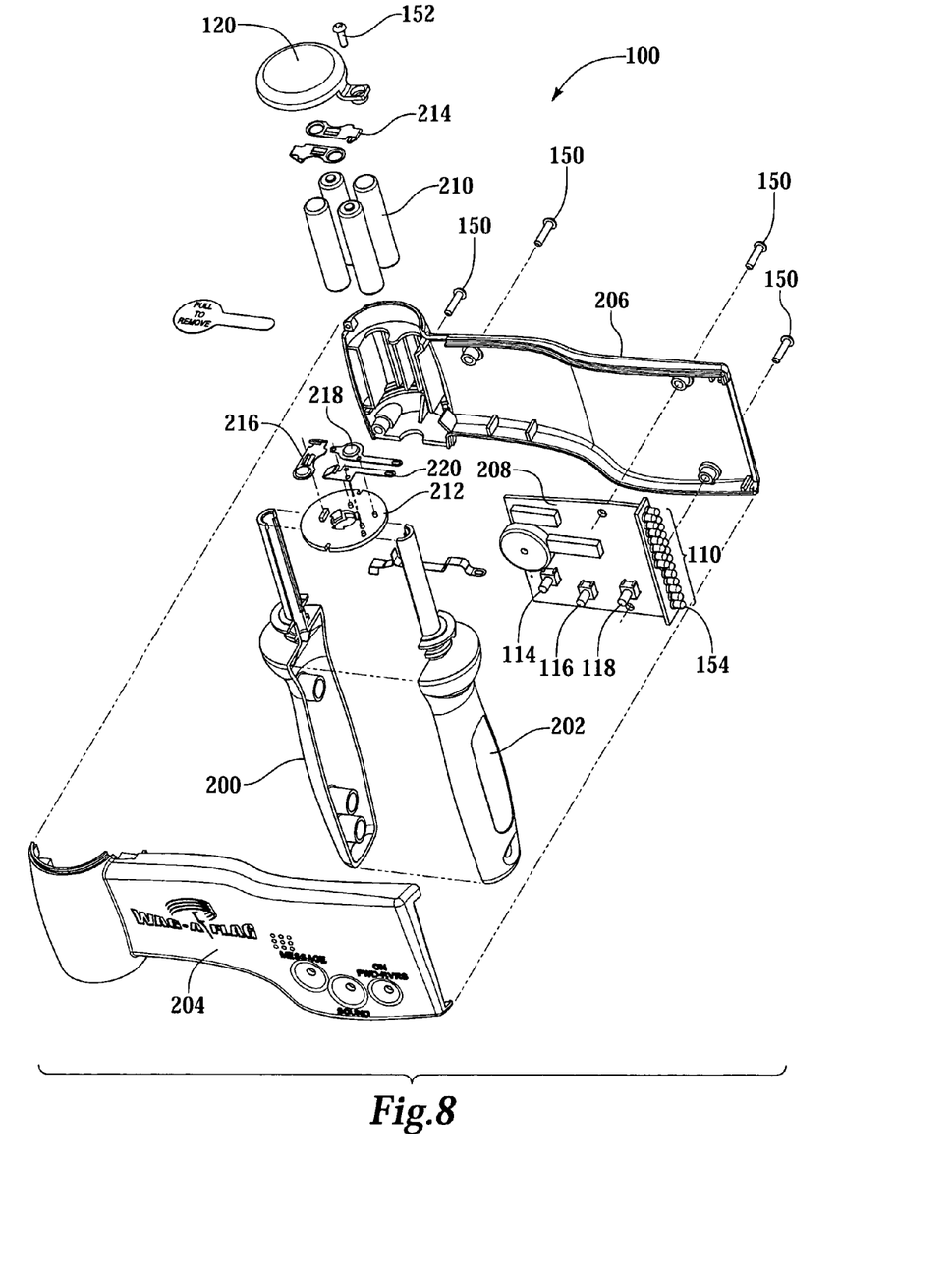
FIG. 8 is an exploded isometric view of the display device.

The relationship of the internal components of display device 100 are shown and depicted in the exploded view of FIG. 8. As seen in FIG. 8, display device 100 includes a first handle shell 200, a second handle shell 202, a front rotary body shell 204 and a rear rotary body shell 206. Disposed between the front rotary body shell 204 and rear rotary body shell 206, in the extension 108, is a printed circuit board assembly 208.

Disposed between the front rotary body shell 204 and rear rotary body shell 206 in the barrel 106, is a set of battery cells 210. Battery cells 210 are further disposed between cap 120 and lower contacts retaining disk 212. Cap 120 retains a pair of upper battery contacts 214 disposed to contact the upper electrical terminals of battery cells 210. Similarly, lower contacts retaining disk 212 retains a set of lower battery contacts 216–220 disposed to contact the lower electrical terminals of battery cells 210. The set of lower battery contacts 216–220 includes first lower contact 216, second lower contact 218 and third lower contact 220. Together, upper battery contacts 214, battery cells 210 and lower battery contacts 216–220 represent a complete voltage source, with the voltage of the source being equal to the sum of the voltages of the battery cells 210. This is due to the fact that the battery cells 210 are disposed in a series arrangement. Alternate embodiments may employ a parallel battery circuit or a combination series-parallel battery circuit in order to increase the current capacity available to display device 100.

Figure 9:
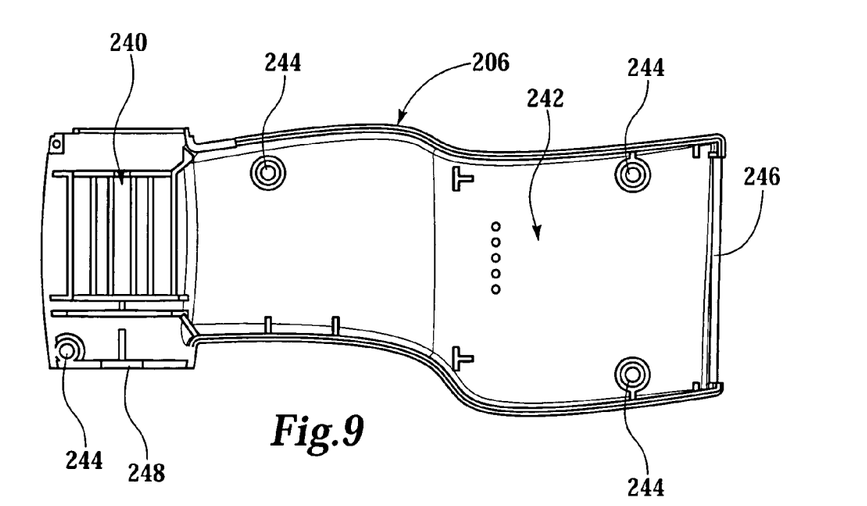
FIG. 9 is an inside view of the rotary body rear shell of the display device.

The interior portion of rear shell 206 is shown in further detail in FIG. 9. Rear shell 206 incorporates a battery compartment 240 inside the barrel 106 and an inner surface 242 inside the extension 108. The rear shell 206 can be secured to the other components of display device 100 through fastener bores 244, although alternate embodiments may employ alternate fastening mechanisms. At the distal end of the rear shell 206 opposite the barrel 106, an LED aperture 246 is disposed. At the proximal end of the rear shell 206 inside the barrel, an axle bore 248 is disposed and shaped and sized for receipt of the axle portion of the handle 102.

Figure 10:
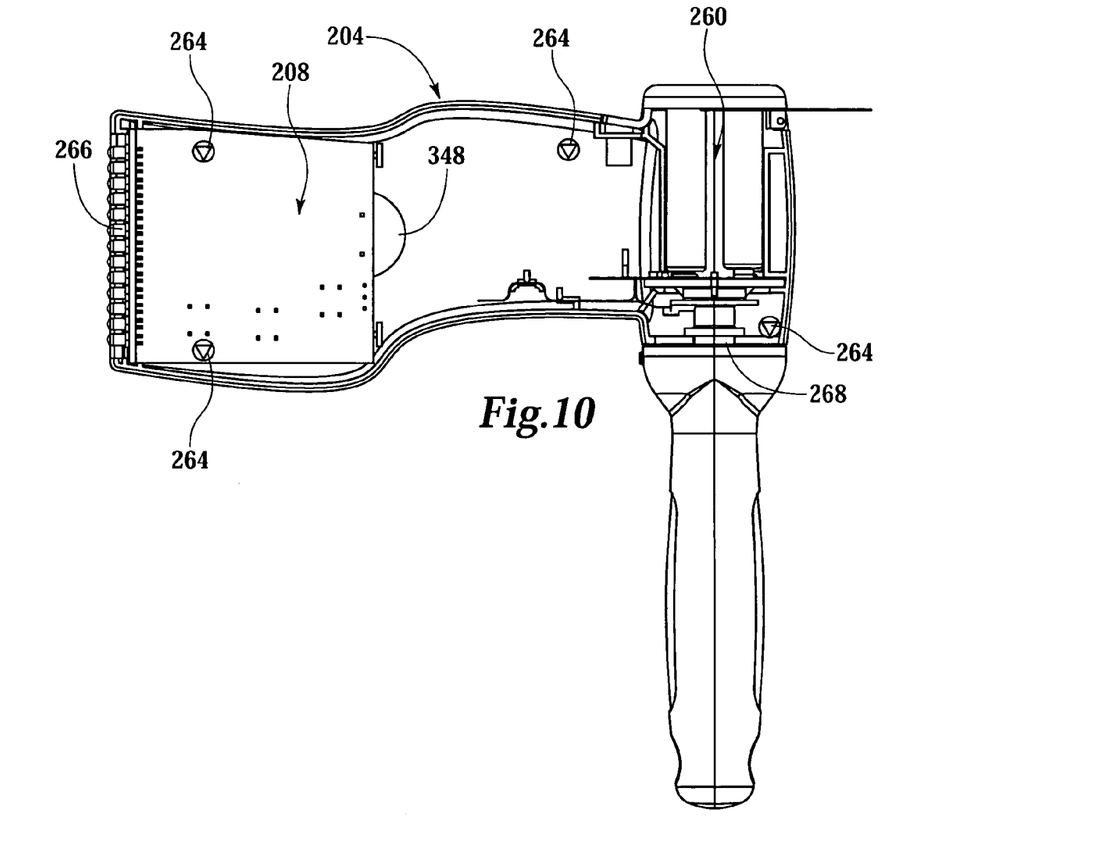
FIG. 10 is an inside view of the rotary body front shell of the display device.

The interior portion of front shell 204 is shown in further detail in FIG. 10. Front shell 204 incorporates a battery compartment 260 inside the barrel 106 and an inner surface 262 inside the extension 108. The front shell 204 can be secured to the other components of display device 100 through fastener bores 264, although alternate embodiments may employ alternate fastening mechanisms. At the distal end of the rear shell 206 opposite the barrel 106, an LED aperture 266 is disposed. At the proximal end of the rear shell 206 inside the barrel, an axle bore 268 is disposed and shaped and sized for receipt of the axle portion of the handle 102.

Figure 11:
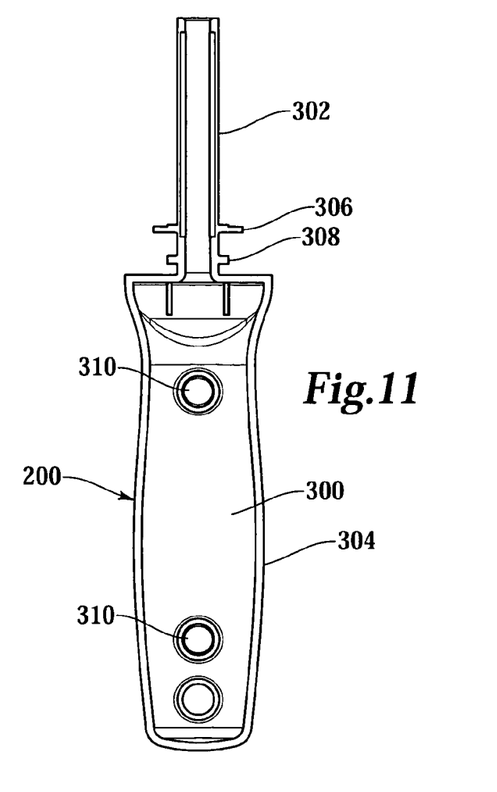
FIG. 11 is an inside view of the left handle shell of the display device.

The internal geometry of first handle shell 200 is shown in FIG. 11. First handle shell 200 has an inner surface 300 disposed within the grip portion 304 and axle portion 302.

Disposed about axle portion 302 is an upper retainer portion 306 and lower retainer portion 308 for axial retention of the rotary body 104 about the axle portion 302 while allowing for free radial motion between the handle 102 and rotary body 104. First handle shell 200 includes two fastener bores 310 to facilitate securement of the first handle shell 200 to other components of the display device 100.

Figure 12:
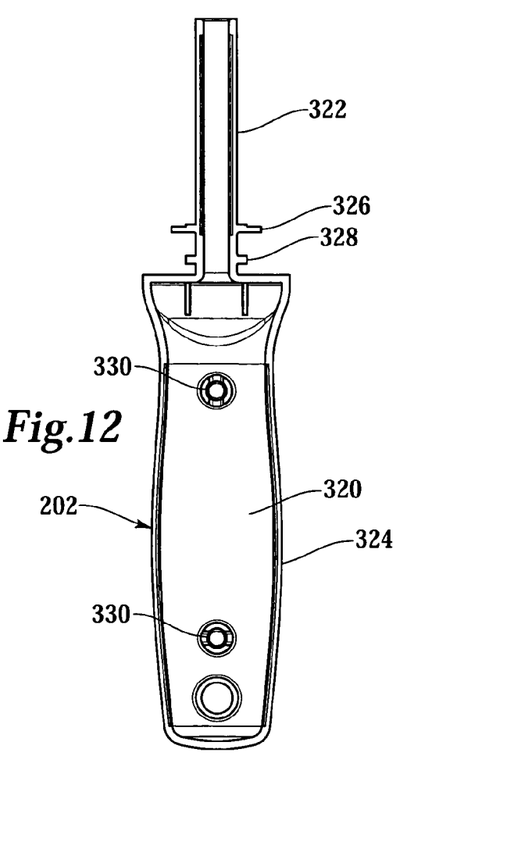
FIG. 12 is an inside view of the right handle shell of the display device.
Figure 13:
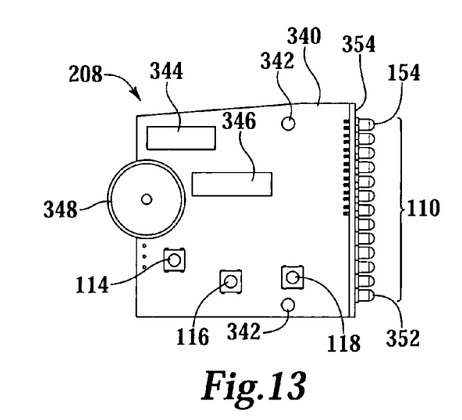
FIG. 13 is a front view of the printed circuit board assembly of the display device.
Figure 14:
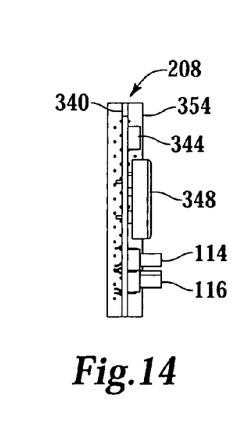
FIG. 14 is a left end view of the printed circuit board assembly of the display device.
Figure 15:
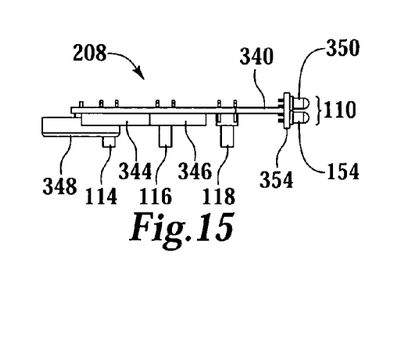
FIG. 15 is a top view of the printed circuit board assembly of the display device.
Figure 16:
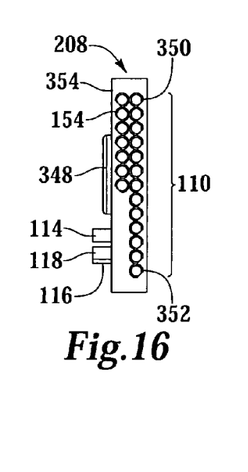
FIG. 16 is a right end view of the printed circuit board assembly of the display device.

The internal geometry of second handle shell 202 is shown in FIG. 12. Second handle shell 202 has an inner surface 320 disposed within the grip portion 324 and axle portion 322. Disposed about axle portion 322 is an upper retainer portion 326 and lower retainer portion 328 for axial retention of the rotary body 104 about the axle portion 322 while allowing for free radial motion between the handle 102 and rotary body 104. Second handle shell 202 includes two fastener bores 330 to facilitate securement of the second handle shell 202 to other components of the display device 100, including first handle shell 200.

The printed circuit board assembly 208 is shown in detail in FIGS. 13–16. Printed circuit board assembly 208 includes a printed circuit board 340 having mounting bores 342 disposed therein. Disposed on the printed circuit board 340 is a message button 114, a sound button 116 and a power button 118. The function of these devices is described in detail above. Also disposed on printed circuit board 340 is an integrated circuit 344, a microcontroller 346 and a speaker 348. At one end of the printed circuit board 340 is disposed an LED array 110, including LEDs 154, 350 and 352, disposed on an LED carrier 354. The function of these components is described in detail in connection with FIG. 19, below.

Figure 17:
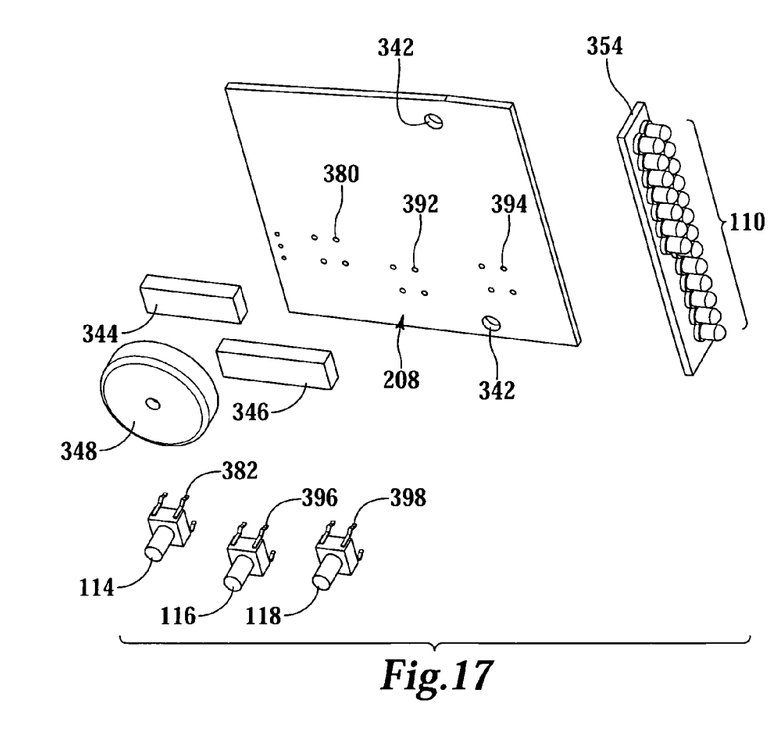
FIG. 17 is an exploded isometric view of the printed circuit board assembly of the display device.

Printed circuit board assembly 208 is shown in exploded form in FIG. 17. In addition to the features described above, it can be seen that printed circuit board 340 incorporates a first thru-hole pattern 380 for receiving message button pins 382 of message button 114, a second thru-hole pattern 392 for receiving sound button pins 396 of sound button 116, and a third thru-hole pattern 394 for receiving power button pins 398 of power button 118.

Figure 18:
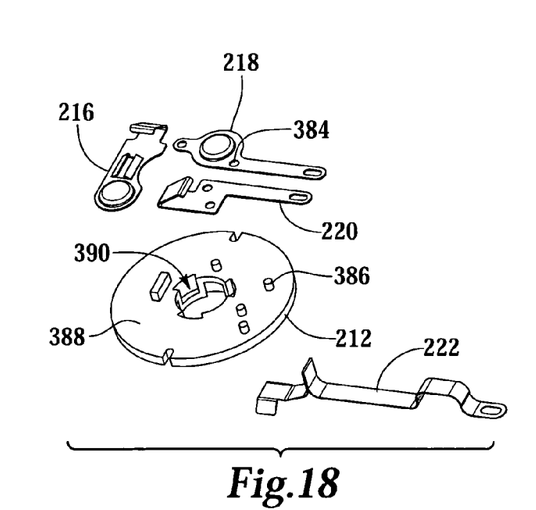
FIG. 18 is an exploded isometric view of the lower battery contact retainer disc assembly of the display device.

The lower battery contact assembly is shown in detail in FIG. 18. Contact retainer disc 212 retains first lower contact 216, second lower contact 218 and third lower contact 220 via a combination of post bores 384 and retaining posts 386. Retaining posts 386 are disposed in the upper surface 388 of the contact retainer disc 212. Also shown is the geometry of axle bore 390, which is shaped and sized to receive the axle portion of the handle 102.

Figure 19:
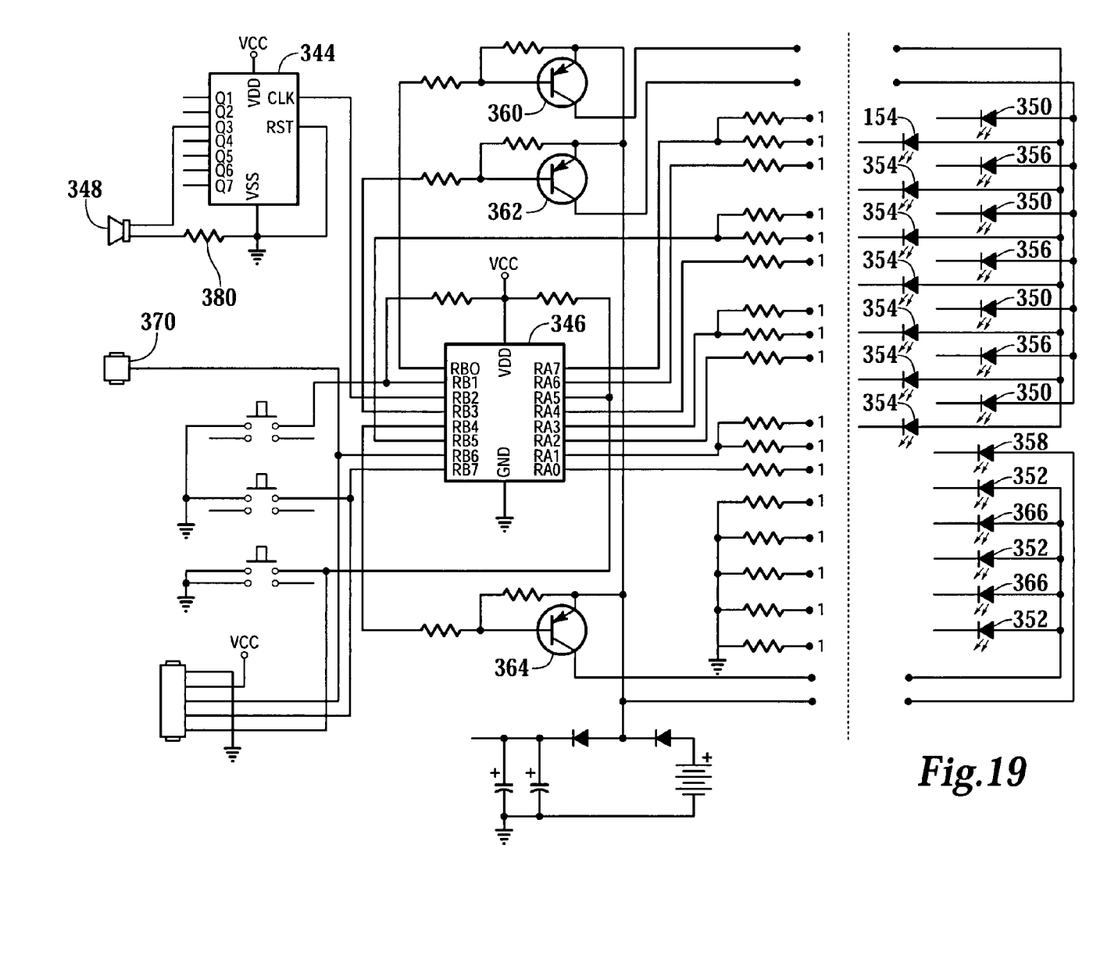
FIG. 19 is a schematic view of the printed circuit board assembly of the display device.

The electronics of the display device 100 are shown in schematic form in FIG. 19. A fundamental component of the display device 100 of the present invention is a microcontroller 346 which may be contained in a single package. This microcontroller 346 contains flash read-only memory (flash ROM) and random access memory. The control program for the microcontroller 346 may be contained in the flash ROM. To minimize the cost of this unit, a relatively simple microcontroller 346 may be used. In one embodiment, the display device employs a microcontroller, although other units may be employed. Most of the pins of microcontroller 346 are used for input and output signals.

In the embodiment shown in FIG. 18, the microcontroller 346 has four inputs, designated RB1, RB7, RA5 and RB6. Three of the inputs are used for push buttons 114–118, which control various options and functions of the display device 100. The forth input is used for an index signal. The index signal is generated by a sensor 370, which sends a pulse stream corresponding to the rate of revolution of the display device 100. In one embodiment, the sensor 370 generates one pulse for each revolution of the display device 100. As the display device 100 is spun, the time between index pulses is used to determine the speed at which the unit is spinning. The time between index pulses is determined with respect to the internal clock oscillator of the microcontroller 346. Once the display device 100 is spinning, the speed of revolution is relatively constant over short intervals, but does vary enough that checking the speed periodically can improve the images displayed. Once the speed of rotation of display device 100 is determined, the timing of data for the LED array 110 can be set. It is desirable to send information to the LED array 100 at a rate which allows proper geometric proportions for text and graphics displayed thereon as well as to stabilize the position of images in space for each subsequent revolution of the LED array 110.

In the embodiment shown in FIG. 18, most of the outputs of microcontroller 346 are used to control LEDs. Although a microcontroller such as microcontroller 364 can generally provide sufficient current to drive individual LEDs directly from its outputs, a multiplexing scheme is used in the present invention in order to increase the quantity of LEDs that can be driven from the limited number of outputs generally available on smaller microcontrollers. In one embodiment, the LEDs 154 are arranged in four groups. The first group is composed of seven blue LEDs, designated 354 in FIG. 18. This group shares a common anode current source PNP transistor 360 which is used to select this group. The second group is composed of four red LEDs 350 alternated with three white LEDs 356. This group also has a common anode current source PNP transistor 362.

The cathodes of the blue LEDs 354 and four red LEDs 350 are tied together through current limiting resistors 364 to outputs of the microcontroller 346. To turn on any LED in either group, first the group is enabled by turning on the PNP current source for that group, and then pulling the cathode for that LED low. This provides a current path to turn on the LED. Although it is possible to turn on LEDs 350 and 354 at the same time, they are usually turned on in an alternate fashion. A single white LED 358 is driven by output pin RAI from the microcontroller 346. The microcontroller 346 has independent control of LED 358 because it is connected exclusively to a single output of the microcontroller 346. The last group is composed of three Red LEDs and two White LEDs.

The last group of red LEDs 352 and white LEDs 366 is controlled by a single source PNP transistor 364. All five of LEDs 352 and 366 are turned on or off simultaneously according to the state of PNP transistor 364, which is controlled by microcontroller output RB4. With the LEDs controlled and arranged in the current configuration, the image of an American flag can be generated by turning on all of the blue LEDs 354, red LEDs 352 and 358 and white LEDs 366 for a first period of time, then turning off blue LEDs 354, and turning on red LEDs 350 and white LEDs 356 for a period of time approximately twice as long as the first period of time.

As noted above, LEDs 350, 352, 356 and 366 are arranged in a single line of alternating red and white LEDs. This allows a sharp edge of the stripes of the flag. Text and/or graphics can also be created by varying the state of LEDs 350 and 356 as the display device 100 rotates. LEDs 358 can also be used to increase the height of the image. Because LEDs 350, 352, 356 and 366 are arranged as alternating red and white LEDs, the image will be composed of alternating red and white bands of dots. Because blue LEDs 354 are independently controlled in the same manner as LEDs 350 and 356, text and/or graphics can be created with blue LEDs 354 as well. The height of the blue image can also be increased by controlling white LED 358, but due to the fact that white LED 358 is physically offset from blue LEDs 354, the timing of the white LED 358 must either precede or follow the timing of blue LEDs 354 depending upon the direction of revolution of display device 100 in order to align the white image with the blue image. Other bursts of color such as fireworks can be generated due to the independent control of the various LEDs. These bursts of color or graphics can also be used to create animated graphics such as exploding fireworks.

When the display device 100 is turned off, the microcontroller 364 is placed in a sleep mode with all of the LEDs and bank transistors turned off. The pulse frequency generator within microcontroller 364 is also stopped. In this mode, the microcontroller 364 draws very little power, such that the life of battery cells 210 in this mode approaches the shelf life of the battery cells 210. When the power button 118 is pressed, the microcontroller 364 detects this change, and is woken up to become active. Various tunes and graphics are stored along with control code in the microcontroller 364. For embodiments of the present invention using flash memory, the display device 100 may be easily reprogrammed with new text, graphics and control code.

If the image displayed on the LED array 110 is repeated each revolution of the display device 100, a static image will be perceived as floating in space. If the timing of the pattern is shifted in time, the image can be seen as moving in one direction or another. If the pattern is altered slightly each time, an animated image can be perceived. If the "on" time of the pattern is increased or decreased with respect to the speed of rotation, a fixed image will appear to contract or expand in width respectively.

Using variations of timing and color, a great many effects can be created with this or other combinations of LEDs. The LEDs could all be independently controlled using a microcontroller with more outputs. The LEDs could be arranged in three groups of color. If one group is Red, the second is Green, and the third is Blue, then by controlling the LEDs either singly or in combination with the other primary colors, any color including White can be generated. A further extension of this idea would allow the intensity of the LEDs to be varied. This would allow various shades of color including gray to be generated. With increased numbers of LEDs, higher resolution displays can be created, and thus finer detailed graphics and texts.

At least one of the microcontroller outputs, designated output RB2 in FIG. 18, is driven by a pulse generator in the microcontroller 346. The frequency of the pulse generated thereby may be reduced in a second integrated circuit 344. In one embodiment, the second integrated circuit 344 divides the frequency of the pulse by a factor of eight. The square-wave output from this second integrated circuit 344 can be used to drive one or more audio transducers, such as speaker 348, to generate sound effects and/or music.

By modifying the frequency of the pulse signal delivered to speaker 348, different notes can be played. In one embodiment, speaker 348 is a piezoelectric device, and responds to voltage changes across a piezoelectric crystal to produce vibrations, thereby generating audible sounds in the surrounding air. If the voltage across a piezoelectric crystal is kept constant, the piezoelectric crystal does not consume power. There is, therefore, no need to determine the logic state of the output of the second integrated circuit 344 driving speaker 348 when no audio signal is desired. If a different type of audio transducer were used for speaker 348, a capacitor would normally be required to achieve the same level of performance at a similar level of power consumption. A true square wave is composed of an infinite series of component signals, including many component signals at the upper end of the 20 kHz human hearing range. Sounds in this range can be unpleasant to the human ear. In certain embodiments, a resistor 380 is placed in series with the speaker 348, which, owing to the inherent capacitance of the piezoelectric transducer, acts as an R-C filter to filter out many of the higher harmonics from the square-wave driving the speaker 348, thus providing a more pleasing tone by "rounding off" the corners of the square wave generated by the digital electronics.

Figure 20:
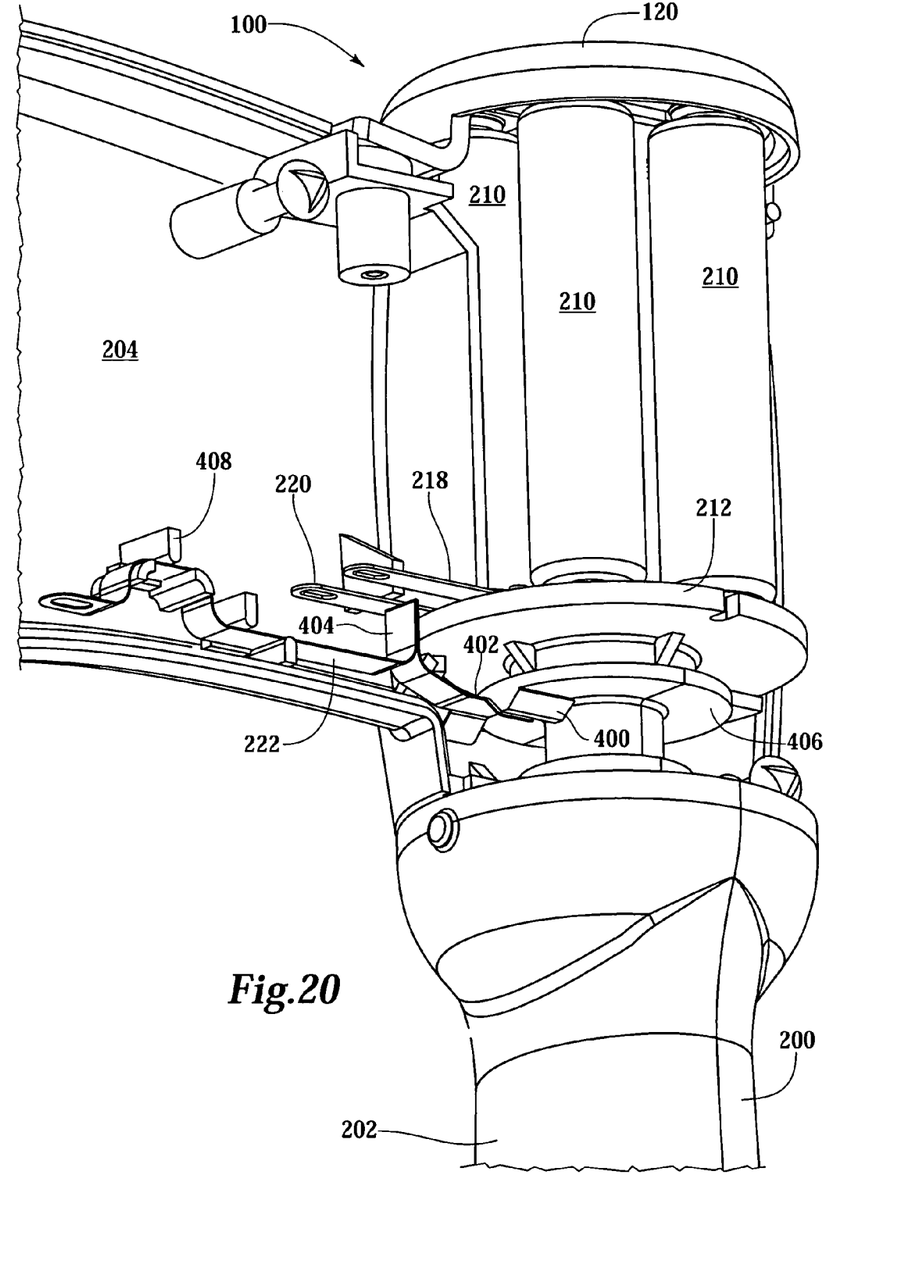
FIG. 20 is a detailed isometric view of the rotational velocity measurement mechanism of the display device.

FIG. 20 depicts a mechanism that may be used for determining the rotational speed of the display device 100 according to one embodiment of the present invention. Together, first handle shell 200 and second handle shell 202 form an axial cam disc 406 disposed beneath lower battery contact retainer disc 212 retaining lower battery contact 218 and lower battery contact 220 at the lower end of battery cells 210. An axial cam lobe 400 is disposed on the lower face of axial cam disc 406 approximately in the center of second handle shell 202. Spring contact 222, fixed in place within rotary body front shell 204 by a set of protruding retaining features 408, has a follower 402 formed into its distal end. Follower 402 rides on the lower surface of axial cam disc 406 as the rotary body 104 revolves about the handle 102. In the position shown in FIG. 20, follower 402 is shown riding on the flat lower surface of the axial cam disc 406. In this position, switch contact 404 rests against, and makes an electrical contact with, the lower surface of lower battery contact 220.

Once per revolution, follower 402 encounters axial cam lobe 400. As axial cam lobe 400 moves across follower 402, follower 402 moves downward, away from the flat lower surface of the axial cam disc 406. As follower 402 moves downward, switch contact 404 moves downward along with it, away from physical and electrical contact with lower battery contact 220. Accordingly, once per revolution, the switch contact 404 breaks electrical contact with lower battery contact 220. As axial cam lobe 400 moves past follower 402, follower 402 moves upward back into contact with the flat lower surface of axial cam disc 406, thereby bringing switch contact 404 back into physical and electrical contact with lower battery contact 220.

Owing to the above operation, repeated revolutions of the rotary body 104 about the handle 102 will generate an electrical pulse train within spring contact 222 having a frequency corresponding to the frequency of the revolution of the rotary body 104 about the handle 102. From this pulse train, the microcontroller 346 can synchronize the timing of the imaging of the LED array 110 to the speed of movement of the LED array 110 in space. Those of skill in the art will recognize, of course, that numerous other methods may be employed to measure rotational speed of the rotary body 104 about the handle 102 without departing from the spirit and scope of the present invention. These methods may include, but are not limited to, other mechanical devices, optical sensors, and magnetic sensors, including but not limited to hall effect sensors and similar devices.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

We claim:

1. A display device comprising:
    a first body;
    a second body connected to the first body at a rotary connection;
    a first display element, disposed on the second body;
    a switch selectively connected to a power source, wherein an electrical pulse is generated when an electrical contact between the power source and the switch is periodically interrupted relative to a movement between the first body and the second body; and
    a controller, electrically connected to the first display element so as to vary the state of the first display element in response to the relative movement between the first body and second body, wherein the relative movement is calculated based on a frequency of the electrical pulses.

2. The display device of claim 1 wherein the first body is a handle.

3. The display device of claim 1 wherein the second body has a generally-rectangular shape and is connected to the first body adjacent to an edge of the rectangular shape.

4. The display device of claim 1 wherein the second body has a proximate end adjacent the first body and a distal end, and wherein the first display element is disposed on the second body at the distal end thereof.

5. The display device of claim 1 wherein the first display element is a light-emitting diode.

6. The display device of claim 1 further comprising a second display element.

7. The display device of claim 6 wherein the first display element emits a first wavelength and the second display element emits a second wavelength.

8. A method of displaying a pattern, the method comprising:
    providing a first body;
    connecting a second body to the first body at a rotary connection;
    providing a switch selectively connected to a power source;
    generating an electrical pulse when an electrical contact between the power source and the switch is periodically interrupted relative to a movement between the first body and the second body;
    disposing a first display element on the second body;
    applying an angular velocity to the second body relative to the first body, wherein the angular velocity is calculated based on a frequency of the electrical pulses; and
    varying the state of the first display element in a predetermined pattern.

9. The method of claim 8 wherein the first body is a handle.

10. The method of claim 8 wherein the second body has a generally-rectangular shape and is connected to the first body adjacent to an edge of the rectangular shape.

11. The method of claim 8 wherein the second body has a proximate end adjacent the first body and a distal end, and wherein the first display element is disposed on the second body at the distal end thereof.

12. The method of claim 8 wherein the first display element is a light-emitting diode.

13. The method of claim 8 further comprising a second display element.

14. The display device of claim 13 wherein the first display element emits a first wavelength and the second display element emits a second wavelength.

15. A device for displaying a pattern, the device comprising:
    a first body;
    a second body attached to the first body at a rotary connection;
    a first display element disposed on the second body emitting a first wavelength;
    a second display element disposed on the second body adjacent the first display element;
    a switch selectively connected to a power source, wherein an electrical pulse is generated when an electrical contact between the power source and the switch is periodically interrupted relative to a movement between the first body and the second body; and
    means for varying the state of the first display element and second display element in a predetermined pattern in response to an angular velocity applied to the second body relative to the first body, wherein the angular velocity is calculated based on a frequency of the electrical pulses.

16. The device of claim 15 wherein the first body is a handle.

17. The device of claim 15 wherein the second body has a proximate end adjacent the first body and a distal end, and wherein the first display element and second display element are disposed on the second body at the distal end thereof.

18. The device of claim 15 wherein the first display element and second display element are light-emitting diodes.

19. The device of claim 15 further comprising a third display element.

20. The display device of claim 15 wherein the second display element emits a second wavelength distinct from the first wavelength.

21. The display device of claim 7 wherein the second display element and the second display element are simultaneously displayed.

22. The method of claim 14 wherein the second display element and the second display element are simultaneously displayed.

23. The display device of claim 20 wherein the second display element and the second display element are simultaneously displayed.

* * * * *